United States Patent
Rioux et al.

(10) Patent No.: US 6,711,735 B1
(45) Date of Patent: Mar. 23, 2004

(54) METHOD OF AUTOMATIC PRODUCTION OF SPECIFICATIONS

(75) Inventors: Laurent Rioux, Massy (FR); Christian Jacolot, Guipavas (FR)

(73) Assignee: Alcatel, Paris (FR)

( * ) Notice: Subject to any disclaimer, the term of this patent is extended or adjusted under 35 U.S.C. 154(b) by 466 days.

(21) Appl. No.: 09/638,903

(22) Filed: Aug. 15, 2000

(30) Foreign Application Priority Data

Aug. 16, 1999 (FR) ............................................. 99 10517

(51) Int. Cl.⁷ ............................................... G06F 9/45
(52) U.S. Cl. ................................................... 717/137
(58) Field of Search ................. 717/104, 124, 717/137

(56) References Cited

U.S. PATENT DOCUMENTS

| | | | | |
|---|---|---|---|---|
| 5,671,416 A | * | 9/1997 | Elson | 717/106 |
| 5,768,564 A | * | 6/1998 | Andrews et al. | 717/137 |
| 6,006,031 A | * | 12/1999 | Andrews et al. | 717/137 |
| 6,148,438 A | * | 11/2000 | Schmit | 717/137 |
| 6,298,476 B1 | * | 10/2001 | Misheski et al. | 717/101 |
| 6,381,743 B1 | * | 4/2002 | Mutschler, III | 717/104 |
| 6,434,739 B1 | * | 8/2002 | Branson et al. | 717/108 |
| 6,453,464 B1 | * | 9/2002 | Sullivan | 717/137 |
| 6,467,079 B1 | * | 10/2002 | Ettritch et al. | 717/108 |
| 6,516,461 B1 | * | 2/2003 | Ichisugi | 717/144 |
| 6,523,171 B1 | * | 2/2003 | Dupuy et al. | 717/136 |
| 6,550,054 B1 | * | 4/2003 | Stefaniak | 717/104 |

OTHER PUBLICATIONS

"An Information and Telecommunication System Development Methodology—Requirement Analysis Phase", Esther J. Choi et al, IEEE Computational Cybernetics and Simulation, 1997 IEEE International Conference, vol. 3, Oct. 1997, pp. 2336–2340.*
"Rational Rose/C++ Round Trip Engineering with Rational Rose/C++", Version 4.0, pp. 1–227, Nov. 1996.*
UML Distilled Appling the Standard Object Modleing Language, Martin Fowler et al, pp. 1–179, published 1997.*
Ando, T. et al.: "Interpretation of SDL Specification in Lotos" Systems & Computers in Japan, US, Scripta Technica Journals. New York, vol. 25, No. 7, Jun. 15, 1994, pp. 19–38, XP000477533.
Orr, R.A: "Systematic Method for Realtime System Design" Microprocessors and Microsystems, GB, IPC Business Press LTD. London, vol. 12, No. 7, Sep. 1988, pp. 391–396, XP000213504, OISSN: 0141–9331.
Douglass, B. P: "Designing Real–Time Systems With the Unified Modeling Language" Electronic Design, US, Penton Publishing, Cleveland, OH vol. 45, No. 20, Sep. 15, 1997, p. 132, 134, 136, 13 XP000774581.

* cited by examiner

*Primary Examiner*—Todd Ingberg
(74) *Attorney, Agent, or Firm*—Sughrue Mion, PLLC

(57) ABSTRACT

Specifications written in SDL are translated into specifications written in UML-RT. To do this a file containing the SDL specifications is analyzed and keywords and groups of keywords of interest are marked therein in order to transform them into corresponding and equivalent keywords in UML-RT.

3 Claims, 4 Drawing Sheets

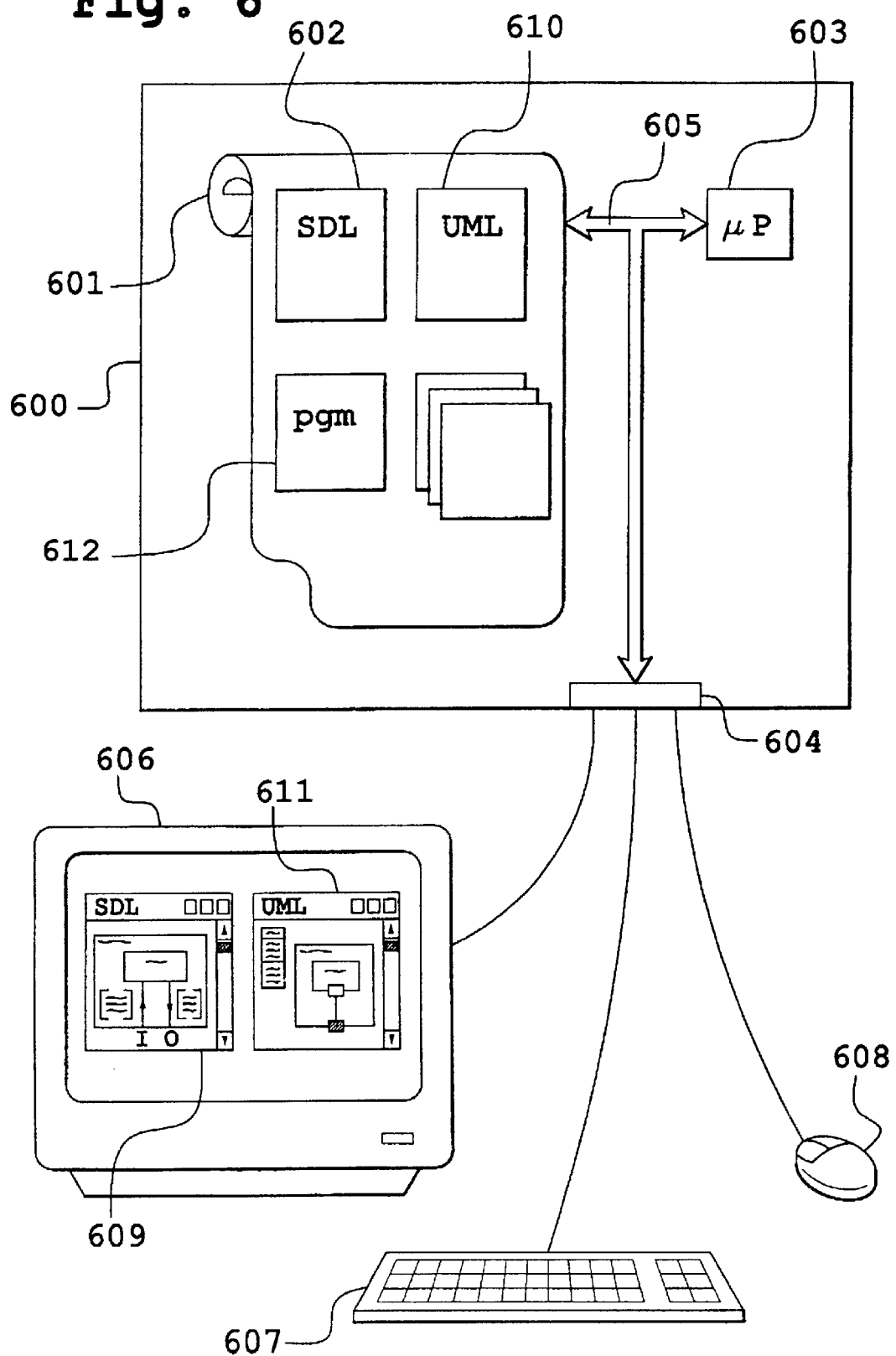

METHOD OF AUTOMATIC PRODUCTION OF SPECIFICATIONS

BACKGROUND OF THE INVENTION

1. Field of the Invention

The invention relates to a method of automatic production of specifications. The field of the invention is that of the description or the specification of protocols and data processing methods. This field is referred to as that of high-level languages or fourth generation languages. A particular feature of such languages is that they simultaneously analyze and solve a problem. The object of the invention is to translate specifications written in an older language into a specification corresponding to another, more recent, language. The translation is automatic, in order to enable existing specifications and descriptions to be re-used at lower cost.

2. Description of the Prior Art

One prior art language is the Specification and Description Language (SDL). It was created in 1980. It is defined by Recommendation Z.100 of the ITU (International Telecommunications Union). SDL was therefore designed from the outset for use in the field of telecommunications. It is therefore particularly well suited to that field, and a few problems arise when attempts are made to use it in other fields, such as aviation, rail transport control and medicine.

SDL is based on a multilevel analysis of a problem. Initially the problem is regarded as a system at the general level, which is the highest level. This is shown in FIG. 1. The system 101 includes blocks such as the blocks 102 and 103, for example. The block 102 communicates with the exterior of the system 101 via a channel 104. The blocks 102 and 103 communicate with each other via a signal path 105.

The block 102 can include a process 106 and a process 107. The process 106 can include one or more services 108 and one or more procedures 109. A service is characterized by a behavior which is represented in the form of a finite state machine. A finite state machine includes states and transitions between states. In FIG. 1, the blocks 102 and 103 are not shown the same size, but they are of equal importance in the hierarchy. Likewise the process 106 and the process 107. By the some token, there can very well be more than two blocks in a system. As a general rule, the number of elements included in an element of a higher level of description varies widely. In an SDL description, the hierarchical nature of the description is therefore expressed by various concepts. A "concept" is a system, process, service, procedure, signal path or channel. Unfortunately, this hierarchy, although highly practical, is also very rigid. What is more, it stems from storage in a back-up memory, which is also very rigid.

A consequence of this rigidity is that once a specification or model has been written, it is very difficult to modify it if it is to evolve or to re-use one of its elements in another specification or model. This is a problem. Two systems can be very close together and require similar development periods, although they are successive in time. With a specification written in a language of this kind, elements of the one cannot be re-used in the other.

Another prior art language is the Unified Modeling Languages for Real Time (UML-RT). It has the same characteristics as SDL, but manipulates only three concepts. These concepts are capsule, port and connection between ports. Each capsule can contain either other capsules or a finite state machine, or both. A model or specification is then formed by a network of capsules interconnected by ports.

FIG. 2 shows a capsule 201 which has a port 202 and a port 203. The capsule 201 also includes a finite state machine 204 which is connected to the port 202. The machine 204 produces states 205 and 206 which evolve through transitions 207 and 208. The capsule 201 also includes the capsule 209 which includes a port 210. The port 210 is connected to the port 203. The capsule communicates with the outside environment via the ports 202 and 203. The main characteristic of UML-RT is the independence of the internal behavior of the capsule 201 and the external environment. UML-RT can therefore be used to model an application using capsules which are easy to re-use for other applications. It is also easy to modify a capsule, because the interior of a capsule is independent of the exterior.

The above two languages, SDL and UML-RT, therefore adopt a totally different approach to problems. SDL is very hierarchical and its hierarchy is fixed, while UML-RT, although hierarchical, is much more flexible to use and to re-use, because of the independence of the capsules.

The invention solves development problems associated with this duality of language by enabling conversion from an older high-level language to another, more recent, high-level language, in the SDL to UML-RT direction. This simplifies the evolution of systems and makes them directly compatible with each other. To this end, in accordance with the invention, the representation in memory of the model of an application in SDL is analyzed. SDL keywords are looked for, and when found are replaced with the equivalent UML-RT keywords. Relations between different elements constituting the model in SDL are then analyzed to convert them into equivalent, and often simpler, relations in UML. This conversion enables elements already developed in SDL to be re-used and also enables evolution of existing applications which were originally written in SDL.

SUMMARY OF THE INVENTION

The invention therefore provides a method of automatic translation from a first specification written in SDL to a second specification written in UML-RT, said first specification including the following concepts: system, block, process, service, channel and/or signal path as a function of a level of detail described in an application to be specified, in which method:

- key SDL concepts corresponding to system, block, process and service are replaced by the UML-RT key concept corresponding to capsule,
- key SDL concepts corresponding to channel and signal path are replaced by the UML-RT key concepts corresponding to connection and port, and
- key SDL concepts corresponding to signal are replaced by the UML-RT key concept corresponding to signal.

In practice, concepts are simply replaced by replacing keywords of one language with keywords of another language in the programs corresponding to the specifications. It will be shown that it is then possible to produce specifications written in a more recent language very quickly from specifications written in an older language. This enables simple updating of existing programs and provides the required modularity and facility for re-use of program elements.

The invention will be better understood after reading the following description and referring to the accompanying drawing. The drawings are provided by way of illustrative and non-limiting example of the invention.

BRIEF DESCRIPTION OF THE DRAWING

FIG. 6 shows the means employed to implement the invention.

DETAILED DESCRIPTION OF THE PREFERRED EMBODIMENT

Figure 1:
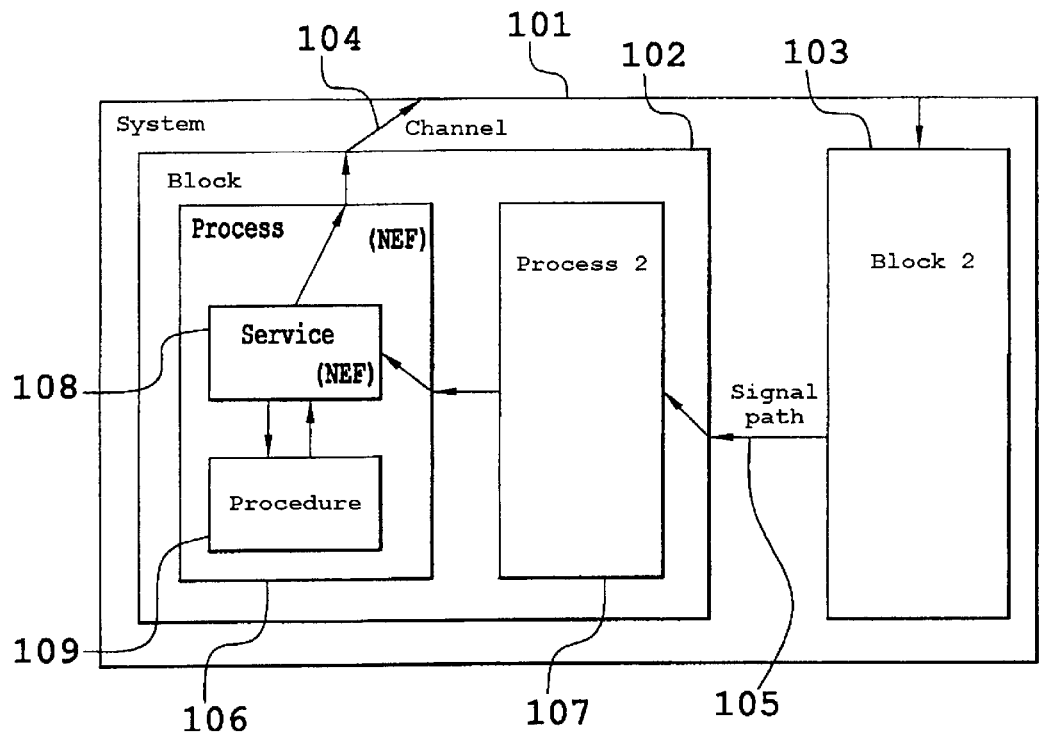
FIG. 1 shows elements used to model or specify an application in SDL.
Figure 2:
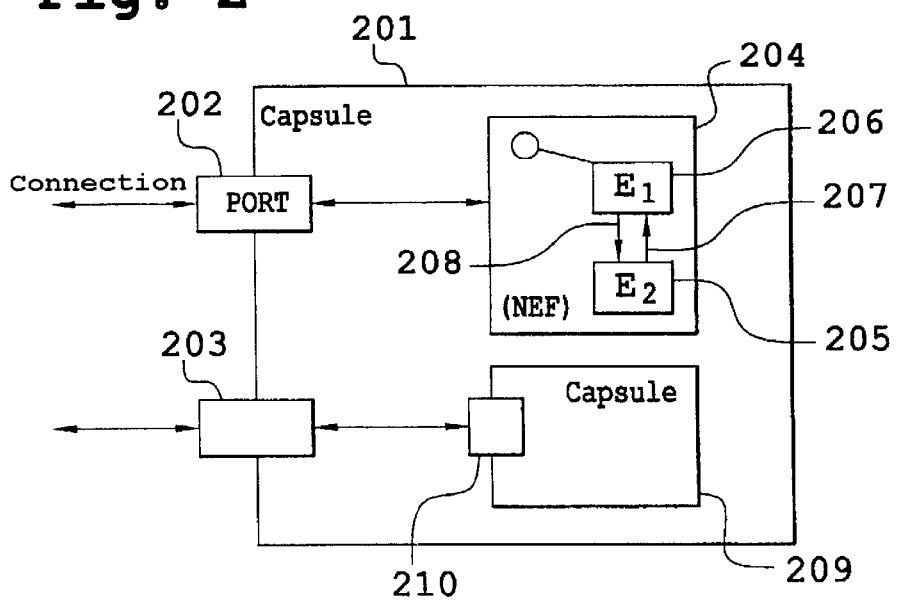
FIG. 2 shows elements used to model or specify an application in UML-RT.
Figure 3A:
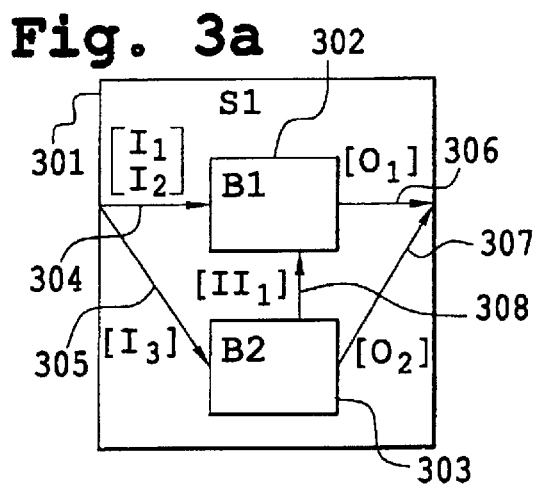
FIGS. 3a to 3c show a model of an application in SDL.

FIG. 3a shows a higher level view in an SDL language description. The analysis is a downward analysis. The deeper one descends into the levels, the closer one approaches the details of an application to be described. FIG. 3a shows a system 301 (S1). The system 301 contains a block 302 (B1) and a block 303 (B2). In one example, the system 301 accepts three input signals I1, I2 and I3. A channel 304 conveys the signals I1 and I2 from the exterior of the system 301 to the block 302. A channel 305 conveys the signal I3 from the exterior of the system 301 to the block 303. SDL refers to a channel when the signals are conveyed from the exterior of the system to the interior of the system or from the interior of the system to the exterior of the system.

A channel 306 conveys an output signal O1 from the block 302 to the exterior of the system 301. A channel 307 conveys an output signal O2 of the block 303 towards the exterior of the system 301. Finally, a signal path 308 conveys an internal signal II1 from the block 303 to the block 302.

In SDL, the signals are therefore conveyed by channels or signal paths, each having an origin and a destination. Those origins and destinations are elements of the description of the language, namely of the systems, blocks, processes or other elements of description.

The content of a program corresponding to FIG. 3a and described literally below is stored in a memory 602. In that memory it takes the form of a text containing keywords specific to SDL. Accordingly, the program corresponding to FIG. 3a is stored in memory in the form of several lines of text, a first line containing the keyword "system" followed by ":" and the name of the system, which is "S1". The program then includes lines of description of the system dependent on the first line either by means of an annotation or by means of symbols encompassing the content of the description of the system. The example uses opening and closing curly brackets, thus: { }. The keywords chosen, that is say "Contains", "Input" and "Output", have been chosen by way of example only.

The program is written:

System: S1 {
  Contains: B1, B2
  Inputs: I1, I2, I3
  Outputs: O1, O2
}
Block: B1 {
  Contains: P1, P2
  Inputs: I1, I2, II1
  Outputs: O1
}
Process: P1 {
  Contains: Ser1
  Inputs: I1, II2
  Outputs: O1
}
Service: Ser1 {
  O1=f(I1, II2)
}

Note that the content of the memory relating to FIG. 3a is not sufficient to describe it totally. On reading it, it is not possible to tell to which block the inputs and outputs relate. To find this out, it is necessary to wait for the description of the blocks contained in the system S1. This is one weakness of SDL, since there is a high correlation between the elements constituting a description and the various levels of the description.

Figure 3B:
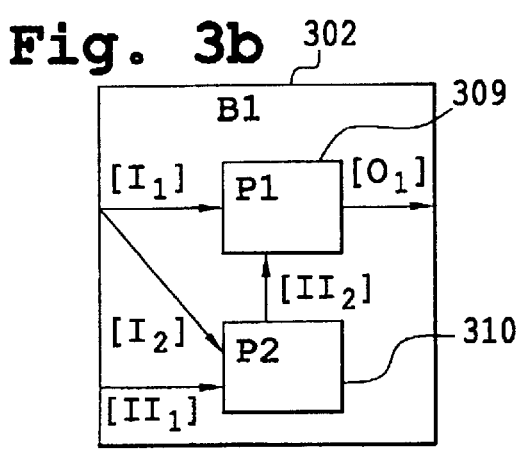

FIG. 3b shows the content of the block 302 in detail. The block 302 contains a process 309 (P1) and a process 310 (P2). FIG. 3b also shows that the process P1 receives the signal I1 and a signal II2 from the process P2. The process P1 has an output signal O1. The process P2 receives as input the signals I2 and II1. The program corresponding to the block 302 is contained in memory in the some fashion as the system S1. However, the keyword to describe it is different since it is a block and no longer a system. The description of the block B1 indicates what it contains, but not how the signals are used within the block. To find this out, it is necessary to know the description of the lower block, for example the process P1.

Figure 3C:
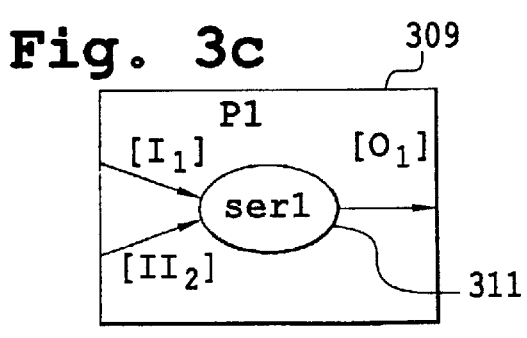

FIG. 3c shows the process P1 in detail. The process P1 contains a service 311 (Ser1). FIG. 3c also shows that the block P1 receives as input the signals I1 and II2 and has at its output the signal O1. In that this process contains only one service, it might appear obvious that the inputs of the process P1 are the inputs of the service Ser1 and that the output of the process P1 is also the output of the service Ser1. However, this is merely a simple case considered by way of example. In practice, there can very well be processes including a plurality of services. Procedures also exist in SDL, but they are processed in the same manner as services. Services and procedures have a behavior which is defined by a finite state machine whose state evolves according to the inputs.

Note that the description of the service Ser1 is strongly related to and conditioned by the description of the various elements that contain it, namely the process P1, the block B1 and the system S1. By analogy with electronics, it could be said to be a hardwired system, in the sense of having soldered connections, and therefore difficult to modify.

Figure 4A:
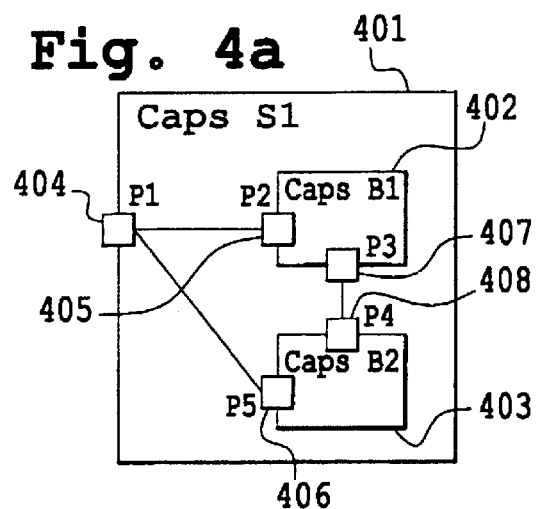
FIGS. 4a to 4c show a model of the some application as FIGS. 3a to 3c, but in UML-RT.

FIG. 4a shows the description of the same system as FIG. 3a, but in UML-RT. FIG. 4a shows a capsule 401 whose name is capsS1. The capsule 401 contains a capsule 402 (capsB1) and a capsule 403 (capsB2). The capsule takes the form of a parallelepiped. The sides of the parallelepiped can contain other, smaller parallelepipeds which are called ports. The capsule 401 has a port P1. The capsule 402 has a port P2 and a port P3. The capsule 403 has a port 406 (P5) and a port 408 (P4). The figure is stored in memory in the form of a text file containing UML-RT keywords. Those keywords are different from those used in SDL. Here, for convenience of description and understanding of the invention, similar keywords are used, in particular for the description of the interior of the capsules. In the part of the description stored in memory corresponding to FIG. 4a, there is the keyword capsule, followed by the name of the capsule, which is capsS1 in this example, and a description of the content of the capsule, which is contained in the example between opening and closing curly brackets, thus: { }. This is therefore read as the capsule capsS1 contains a capsule capsB1 and a capsule capsB2 as well as a port P1.

This is written in the following manner:

Capsule: capsS1 {
   Contains: capsB1, capsB2
   Ports: P1
}
Capsule: capsB1 {
   Contains: capsP1, capsP2
   Port: P2, P3
}
Capsule: capsP1 {
   Contains: Ser1
}
. . .
   Connection P1, P2
   Connection P1, P5
   Connection P3, P4
   Connection P2, P6
   Connection P2, P9
   Connection P3, P10
   Connection P7, P8
   Connection P6, P11
   Connection P7, P12

The description of the capsule P1 is not sufficient to establish the links which exist between the capsules that it contains and itself. However, that description is not contained in the capsule that it contains either. It is necessary to wait for the remainder of the file describing the application in UML-RT to find out how the corresponding ports are connected to the various capsule. This makes it possible to distinguish between the behavior of the capsules, that is to say their utility, and the manner in which they communicate with the other elements of the application.

Figure 4B:
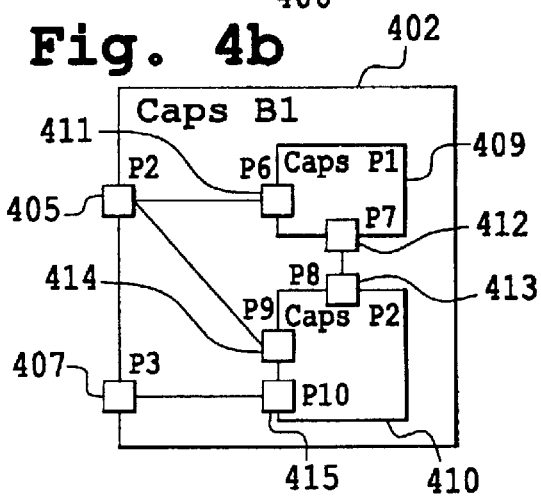

FIG. 4b shows the content of the capsule capsB1. It should be referred to in parallel with FIG. 3b. The capsule 402 includes a process 409 (capsP1) and a process 410 (capsP2). The capsule capsB1 also contains the ports 405 and 407. The capsule 409 contains the ports 411 (P6) and 412 (P7). The capsule 410 contains the ports 413 (P8), 413 (P9) and 415 (P10).

All the capsules are represented in the some manner in memory by corresponding program texts.

Figure 4C:
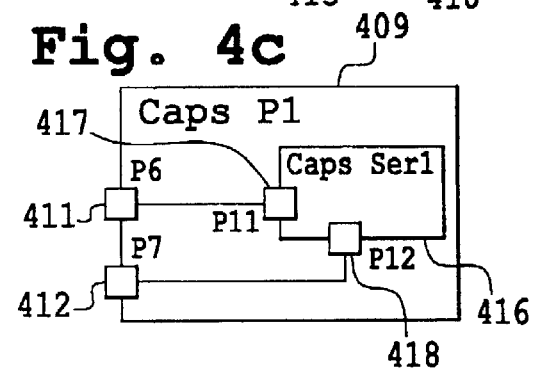

FIG. 4c shows the content of the capsule 409. The capsule 409 contains a finite state machine 416 (capsSer1) whose behavior is identical to that of the finite state machine 311 shown in FIG. 3c. However, the two finite state machines are not described in the same fashion. The service 416 includes the ports 417 (P11) and 418 (P12).

In the UML-RT description in memory, the description of the capsules is followed by a list of the connections that exist between the various ports of the capsules. It is therefore a simple matter to modify a capsule or to use it in another application. Knowing the name of a capsule indicates everything that it contains, namely sub-capsules and all the ports associated with the capsules and the sub-capsules. To obtain the complete capsule all that is then required is to read off from the list of connections the connections which use the ports contained in the capsule.

Figure 5:
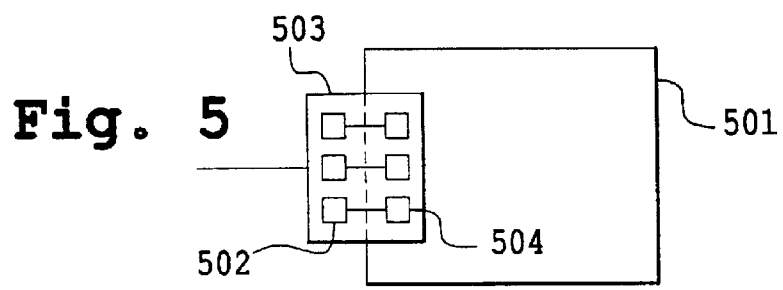
FIG. 5 shows a detail of a UML-RT capsule.

FIG. 5 shows the principle of a port. FIG. 5 shows a capsule 501 including a port 502. The port 502 can be divided into two parts, namely a part 503 external to the capsule and a part 504 internal to the capsule. The behavior of the capsule is defined relative to the internal part 504. On the other hand, when it is used, the capsule is seen by its external part 503. By analogy with electronics, this is a connection, in contrast to the hardwiring of SDL.

FIG. 6 shows a computer 600 including a memory unit 601, a microprocessor 603 and a communication peripheral 604. The units 601, 603 and 604 are interconnected by a bus 605. The peripheral 604 connects the computer to a screen 606, a keyboard 607 and a pointing device 608.

The memory unit 601 includes a memory 602 whose content is represented on the screen 606 in a graphical manner in a window 609. The window 609 contains elements corresponding to SDL and to the description contained in the memory 602. The transfer from the memory 602 to the window 609 is effected by a program contained in the memory 601 and executed by the microprocessor 603. The data necessary for the display is conveyed by the bus 605 and then the device 604. The memory unit 601 also includes a memory 610 corresponding to UML-RT and whose content is displayed on the screen 606 in a window 611. A program according to the invention contained in a memory 612 of the unit 601 transcribes the contents of the memory 602 into the memory 610.

According to the invention, the program in the memory 612 has the microprocessor 603 read the program text contained in the memory 602 and look for SDL keywords. Once it has found them, it replaces them with appropriate UML-RT keywords. It then writes into the memory 610 a program text resulting from such replacement. In practice it is a matter of finding keywords corresponding to the words system, block, process, service and procedure and replace them with the keyword capsule. However, the name of the different characteristic elements of the languages can very well be exactly the same from one representation to another.

The program 612 then determines the number of ports it requires for each capsule created in this way. To determine the number of ports, it determines the number of sources from which the capsule will receive signals. There is a port for each source. Accordingly, in one example, the capsule 410 receives the signal I2 from the port P2 and the signal I11 from the port P3 and sends the signal I12 to the capsule 409. The capsule 410 therefore has three ports.

Once the program 612 has transcribed the contents of the memory 602 into the memory 610, the contents of the memory 610 can then be displayed in the window 611 using existing tools for graphical display of the contents of the memory 610. In practice HTML is programmed directly via a graphical user interface. This means that the file 610 is generated automatically from drawings done by the user in the window 611 using the keyboard 607 and the pointing device 608.

Thanks to the characteristics of UML-RT, a user is able, employing the appropriate tools, to modify and to cause to evolve the contents of the memory 610 and therefore to re-use or to cause to evolve programs initially written in SDL, which was not possible before.

Figure 7A:
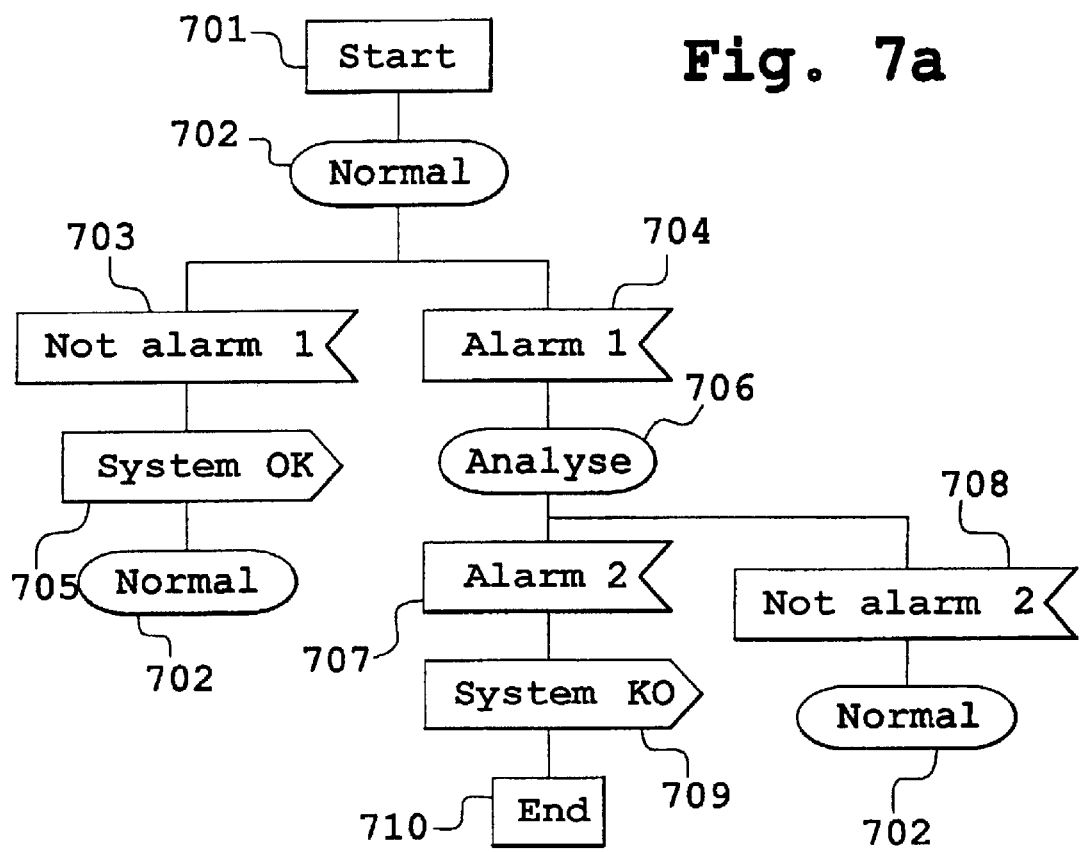
FIG. 7a shows the description of the behavior of a service in SDL.

FIG. 7a shows a description of the behavior of a service in SDL. It is a graph describing the behavior of a finite state machine. The figure includes different types of state, including a starting state 701. The state 701 exists only to indicate that it is the first action undertaken the first time the service is invoked by the application of which it is part. In this example, the state 701 is followed by a normal state 702. The state 702 is an action state, meaning that it corresponds to operations effected by the service when it is in that state.

In this example the state 702 corresponds to a normal activity of the application. The graph is stored in the memory 602 with a syntax corresponding to SDL.

Behavior of an SDL service:
Start: normal state
State: normal
   Action1: . . .
   Action N: . . .
   Next: no alarm 1 AND alarm 1
State: no alarm 1
   Signal: alarm
   Condition: alarm=false
   Next: system OK
State: system OK
   Signal: RAS
   Value: true
   Next: normal
State: alarm 1
   Signal: alarm
   Condition: alarm=true
   Next: analysis
State: analysis
   Action 1: . . .
   Action M: . . .
   Next: alarm 2 AND not alarm 2
State: alarm 2
   Signal: alarm
   Condition: alarm=true
   Next: system KO
State: not alarm 2
   Signal: alarm
   Condition: alarm=false
   Next: normal
. . .

State 702 is followed by state 703 "not alarm 1" and state 704 "alarm 1". These two states are signal wait states. This is a weakness of SDL representation, because on leaving the state 702 the service is in one of two states, which makes it difficult to understand the graph. Moreover, it is possible to confuse an action of the service and mere evolution or transition between two states.

State 703 is followed by state 705 "system OK" which is a state of transmission of a message indicating that the system is OK. In this example the service monitors the activity of any process. Then, when the message has been sent, i.e. after the description existing in memory of the state "system OK", it is a question of setting true a signal whose name is RAS, the next state is state 702. Another defect of SDL is that it represents several times over states through passed through more than once during execution of the service. Thus state 702 is shown three times in FIG. 7a. Because a screen has a given size and therefore a limited display capacity in terms of number of states, this can make it difficult to understand a service.

State 704 is followed by state 706 "analyze". This state is followed by states 707 "alarm 2" and 708 "not alarm 2". These states are identical to state 703 and 704, except that they are not followed by the some states. This factor is not taken into account in the representation of the service in the memory 602. In the case of states effecting numerous actions this can be a problem in terms of memory occupancy, and also in terms of application maintenance. In this case there are several maintenance points to be resolved to solve one and the some problem.

State 707 is followed by state 709 "system KO" which outputs a signal indicating that the application cannot continue. State 709 is then followed by state 710 "end" indicating that the service is stopping.

State 708 is followed by state 702.

Figure 7B:
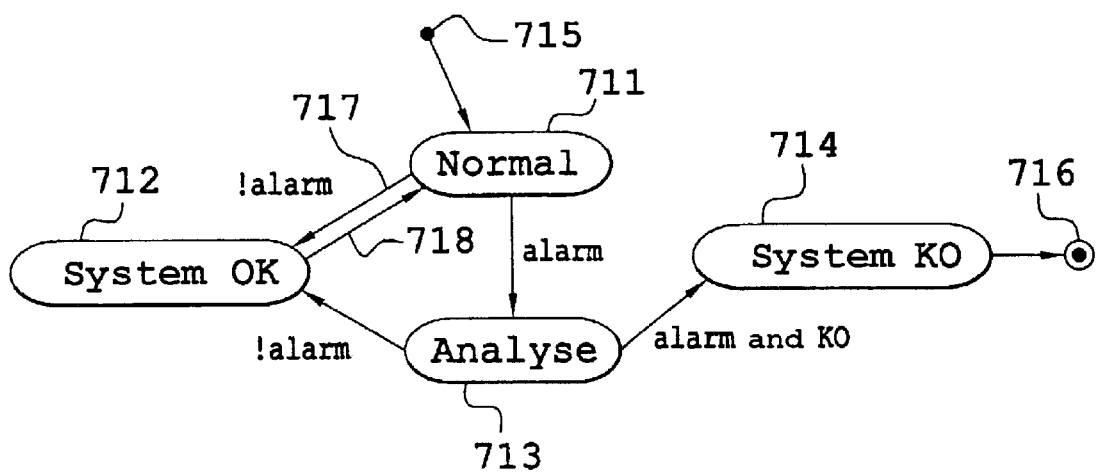
FIG. 7b shows the description of the behavior of a capsule in UML-RT.

FIG. 7b shows a finite state machine representing the some service as FIG. 7a but in a UML-RT environment. The change from one to the other is effected by analyzing the content of the memory 602 relating to the service. One illustration of the service is provided by the listing Behavior of an SDL service. The content of the memory 602 is read to detect the keywords indicating states. The states of interest are the action states and the message sending states which are translated into states in UML-RT. Of course, the states represented more than once are not duplicated.

Behavior of a UML-RT service:
State 1: normal:
   Property: start.
   Action 1: . . .
   Action N: . . .
State 2: analyze:
   Property:
   Action 1: . . .
   Action M: . . .
State 3: system OK:
   Property:
   Action 1: RAS=1
State 4: system KO
   Property: final
   Action 1: RAS=0
Transition 1→3: alarm=false
Transition 3→1: true
Transition 1→2: alarm=true
Transition 2→4: alarm=true and KO=true Thus states 702, 705, 706 and 709 are respectively translated into states 711 "normal", 712 "system OK", 713 "analyze" and 714 "system KO". Each UML-RT state created in this way is allocated a number that is used to define the transitions. The number of states is therefore reduced in the translation from SDL to UML-RT and the visualization of the service described is therefore improved. Each state in UML-RT has properties. Thus state 711 is the starting state as it is the one which follows immediately the starting state 701 in the SDL description. Similarly, state 714 is a final state because no state follows it. The starting and final states are visualized by respective symbols 715 and 716.

The storage of the states in the memory 610 is accompanied by the description of the transitions. The transitions are obtained by analyzing the states receiving SDL signals, i.e. states 703, 704, 707 and 708. They are detectable because they include a keyword relating to a condition. Accordingly, the UML-RT transition 717 corresponds to state 703 of the SDL graph.

There are also unconditional state to state transitions, for example that from state 705 to state 702, which is effected as soon as the action of state 705 has been effected. These transitions are translated by systematic transitions. An illustration of this is the transition 718, which is always valid, meaning that its validation condition, stored in the memory 610, is always true. In the representation Behavior of a UML-RT service, this is the transition 3→1.

What is claimed is:

1. A method of automatic translation from a first specification written in SDL to a second specification written in UML-RT, said first specification including the following concepts: system, block, process, service, channel and/or signal path as a function of a level of detail described in an application to be specified, said method comprising the steps of:

replacing key SDL concepts corresponding to system, block, process and service by a UML-RT key concept corresponding to capsule, replacing key SDL concepts corresponding to channel and signal path by UML-RT key concepts corresponding to connection and port, and replacing a key SDL concept corresponding to signal by a UML-RT key concept corresponding to signal.

2. The method claimed in claim 1, wherein, to translate SDL signal channels and paths, said method further comprises the steps of:

identifying channels and paths of unidirectional signals having common origin or destination ends; and grouping together these SDL signal channels and paths in a bidirectional UML-RT connection between two or more UML-RT ports using the same protocol defined on the basis of signals which transit via the signal channels and paths grouped together in this way.

3. The method claimed in claim 1, further comprising the steps of:

identifying SDL signal transmission and action states with UML-RT states, and translating SDL signal wait states by UML-RT transitions.

* * * * *